L. G. SCHAENEMAN.
BARREL.
APPLICATION FILED APR. 8, 1913.

1,145,801. Patented July 6, 1915.
2 SHEETS—SHEET 1.

Inventor
Lewis G. Schaeneman
By Victor J. Evans
Attorney

Witnesses

L. G. SCHAENEMAN.
BARREL.
APPLICATION FILED APR. 8, 1913.
1,145,801.
Patented July 6, 1915.
2 SHEETS—SHEET 2.
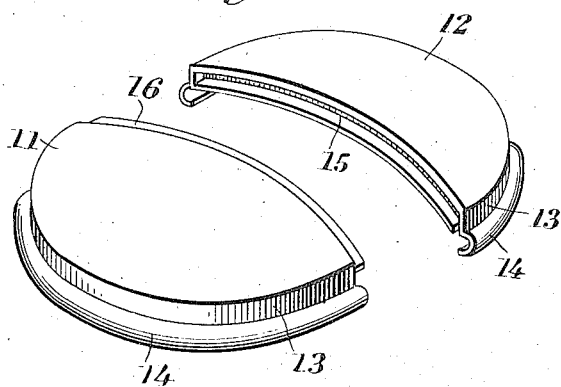
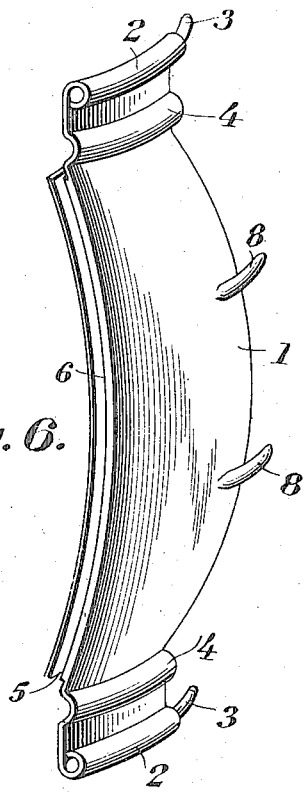
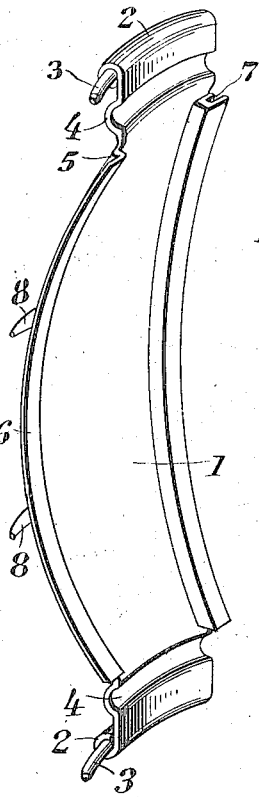
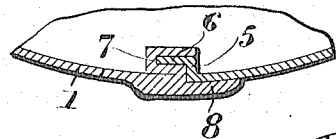
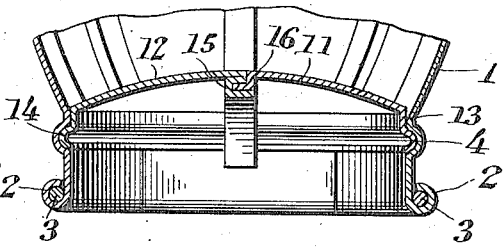
Inventor
Lewis G. Schaeneman
By Victor J. Evans
Attorney
Witnesses

UNITED STATES PATENT OFFICE.

LEWIS G. SCHAENEMAN, OF ALBANY, NEW YORK.

BARREL.

1,145,801.

Specification of Letters Patent. Patented July 6, 1915.

Application filed April 8, 1913. Serial No. 759,788.

*To all whom it may concern:*

Be it known that I, LEWIS G. SCHAENEMAN, a citizen of the United States, residing at Albany, in the county of Albany and State of New York, have invented new and useful Improvements in Barrels, of which the following is a specification.

The present invention relates to improvements in knock-down or collapsible barrels, and resides in the construction, combination and operative arrangement of parts set forth in the following description and falling within the scope of the appended claims.

Figure 1:
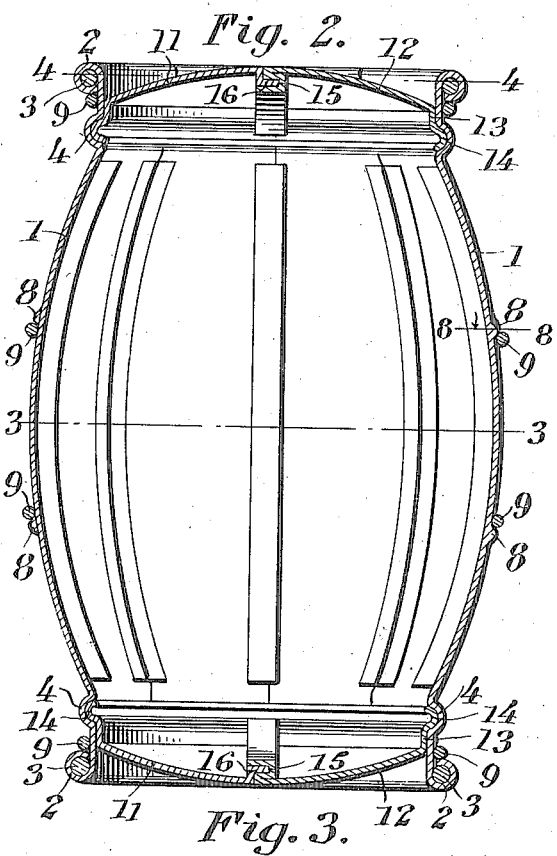
Figure 2:
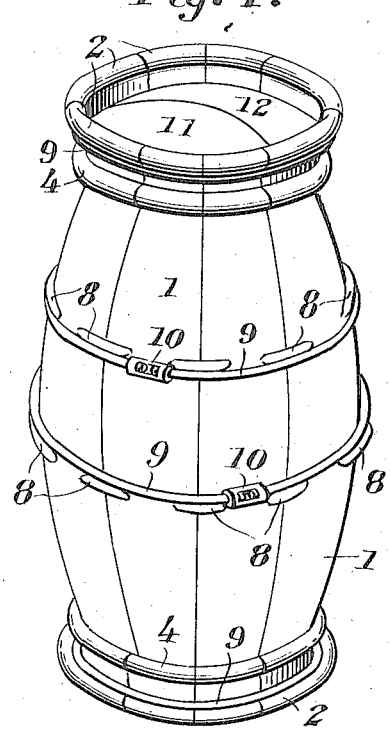
Figure 3:
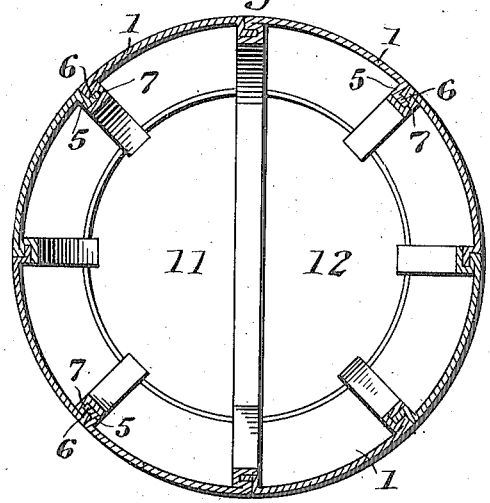
Figure 4:
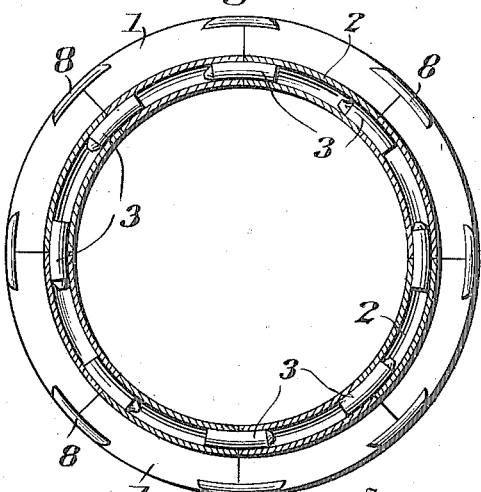

In the drawings, Figure 1 is a perspective view of a barrel constructed in accordance with the present invention, Fig. 2 is a vertical central longitudinal sectional view of the same, Fig. 3 is a horizontal sectional view of the same on the line 3—3 of Fig. 2, Fig. 4 is a sectional view on the line 4—4 of Fig. 2, Fig. 5 is a detail perspective view of one of the heads, the elements comprising the same being separated, Fig. 6 is a detail perspective view looking toward the outer face of one of the staves, Fig. 7 is a similar perspective view looking toward the opposite edge and toward the inner face of said staves, Fig. 8 is a detail horizontal sectional view on the line 8—8 of Fig. 1, and Fig. 9 is a detail sectional view illustrating one of the heads reversed to arrange its concaved face to the end of the barrel.

In carrying out my invention, it is my purpose to construct a barrel of any desired material, metal preferred, wherein the staves will each have an interlocking connection one with the other, and which, when the barrel is set up, will be susceptible to hard usage without danger of collapsing the same, but which will prevent of the ready separation of the heads and staves so that the barrel may be collapsed and folded into a small bundle for storage or for transportation.

In reducing my improvement to practice, I construct a barrel made up primarily of a desired number of staves 1 which, when all of the staves are associated or connected, will provide the complete body for the barrel. It is therefore to be understood that any desired number of staves may be employed, and while each of the staves is preferably of an equal width, certain staves of lesser or larger width may be employed in completing the body. The staves, are rounded in the usual manner both vertically and transversely, that is, the central portion of each of the staves bulges from its opposite ends and edges, to conform with the usual formation of the ordinary staves. The staves, when constructed of metal, have their opposite longitudinal edges curved outwardly and inwardly to provide beads 2, and secured within each of the beads and projecting a suitable distance beyond one of the edges thereof, is a pin 3 which is adapted to be received within the portion of the bead not provided with the pin, in the co-acting or adjacent stave. The staves at a suitable distance beyond their beads have their inner faces depressed transversely, as indicated by the numerals 4, the said depressed portions when all of the staves are assembled, providing circumferential recesses or pockets, for a purpose which will hereinafter be fully set forth. Each of the staves 1, just beyond the pocket 4, has one of its side edges bent inwardly, as at 5, and from thence projecting outwardly to provide a tongue 6. The opposite edge of each of the beads beyond its pockets 4 is bent inwardly and rearwardly against its inner face, and from thence continued outwardly to provide grooves 7 which are adapted to receive the tongues of the co-acting or adjacent staves. The portion 7' of the edge that forms one side of the groove 7 tends to move toward the body of the stave because of the resiliency of the metal, thereby tightly contacting with the tongue 6 for accomplishing an air and liquid tight joint. When the barrel is constructed of metal, the members forming the grooves 7 are adapted to exert a pressure toward each other, so as to frictionally contact with the opposite edges of the tongue engaged therein, and thus provide a tight joint between the staves which will prevent leakage of the dry material adapted to be contained in the barrel. The body of each of the staves, at suitable points have one of their edges formed with extending fingers 8, the said fingers being constructed of resilient metal and adapted to bear against the co-acting or adjacent stave, to force the tongue and groove of the staves into greater frictional engagement.

When the staves are assembled to provide the body of the barrel, a plurality of retaining hoops or ring members 9 are employed. These ring members preferably comprise split members and each of the said members may be readily bent upon itself to occupy a small space when not employed upon the barrel. One of these members is arranged adjacent each of the fingers 8, while other of said members are arranged between the outwardly bulged portion provided by the recesses 4 and the beads 2 of the staves. The hoop or ring members 9 may, and preferably have their ends threaded for the reception of a securing element in the nature of a turnbuckle 10, but it is obvious that the said members 9 may have their ends detachably connected to permit of the compression of the said members in various other manners.

The heads for the barrel will also be preferably constructed of metal, and each of said heads comprises two separable members 11 and 12 respectively. The members 11 and 12 are each of a semi-cylindrical formation and each is provided upon its rounded portion with a peripheral flange 13 which terminates in an outwardly bulged or rounded flange 14, and the flanges 14 are adapted to be received within the pockets or recesses 4 and to be tightly compressed therein when the hoops or rings are secured upon the staves, and the barrel is in its set up position. One of the straight faces of one of each of the head members is provided with a longitudinally extending groove 15, formed substantially as are the grooves 7 of the staves, and the straight face of the co-acting head section 11 is formed with a longitudinally extending tongue 16 formed substantially similar to the tongue 6 of the staves and the tongues are adapted to be received within the grooves when the head members are arranged upon the barrel.

It is to be understood that the hoops and ring members which are disposed between the bead 2 and the bulging portion provided by the recess 4, at the upper end of the barrel, when its turnbuckle is released is loose in the same will permit of the withdrawal of the head at the top of the barrel from the said barrel so that access to the barrel may be obtained, and further, and as illustrated in Fig. 8 of the drawings, the heads may be inverted. This latter is especially desirable when the contents of the barrel is not sufficient to fully fill the barrel, as will be readily understood.

It should be stated that the barrel heads are of a concavo-convex formation in cross section, the concavity providing for an additional amount of product being received within the barrel than would be possible should only a flat head be employed, and the convexed portion serving as a means for compressing the contents of the barrel when the same is arranged within the interior of the barrel.

From the above description, taken in connection with the accompanying drawings, it will be noted that upon the removal of the bands or hoops 9, the staves 1 may be folded one upon the other, and the heads separated and arranged upon the staves, while the said hoops are bent and arranged either between the staves or within the concavities of the heads. One or more of the said hoops may be also employed for securing the folded elements of the barrel, so that the same may be shipped without danger of any of the parts becoming separated, and from the above description, it is thought that the advantages of the structure, will be apparent without further detailed description.

Having thus described the invention, what I claim as new is:

1. A barrel having its body portion made up of a plurality of staves, each stave having one of its longitudinal edges formed with a tongue which lies parallel with the inner surface of the adjacent stave, the remaining edge of the stave being bent back upon itself and then forwardly to form a groove adapted to receive the tongue on the adjacent stave, and resilient fingers carried by the staves and spaced at intervals for increasing the tightness of fit between the tongue and one wall of the groove.

2. A barrel having its body portion made up of a plurality of staves, each stave having one of its longitudinal edges formed with a tongue which lies parallel with the inner surface of the adjacent stave, the remaining edge of the stave being bent back upon itself and then forwardly to form a groove adapted to receive the tongue on the adjacent stave, and resilient fingers connected at spaced intervals to each stave adjacent one of its longitudinal edges and bearing upon an adjacent stave for increasing the tightness of fit between the tongue and one wall of the groove.

In testimony whereof I affix my signature in presence of two witnesses.

LEWIS G. SCHAENEMAN.

Witnesses:
　WILLIAM F. SEGERITZ,
　PETER C. MYERS.